United States Patent [19]

Gupta et al.

[11] 4,063,174

[45] Dec. 13, 1977

[54] CIRCUIT ARRANGEMENT FOR DIVERSITY DATA TRANSMISSION

[75] Inventors: Jutta Das Gupta, Wolfratshausen; Wernhard Markwitz; Werner Paetsch, both of Munich, all of Germany

[73] Assignee: Siemens Aktiengesellschaft, Munich, Germany

[21] Appl. No.: 700,880

[22] Filed: June 29, 1976

[30] Foreign Application Priority Data

July 2, 1975 Germany .............................. 2529574

[51] Int. Cl.² .............................................. H04B 7/02
[52] U.S. Cl. ................................... 325/304; 307/211; 343/201
[58] Field of Search ................. 325/56, 304, 305, 306; 343/200, 201, 205, 206; 307/211, 219

[56] References Cited

U.S. PATENT DOCUMENTS

| | | | |
|---|---|---|---|
| 2,803,703 | 8/1957 | Sherwin | 325/56 |
| 3,422,357 | 1/1969 | Browne | 325/304 |

Primary Examiner—Robert L. Griffin
Assistant Examiner—Marc E. Bookbinder
Attorney, Agent, or Firm—Schuyler, Birch, Swindler, McKie & Beckett

[57] ABSTRACT

A circuit arrangement is described for carrying out a diversity selection from a number of data channels. The diversity channels are connected to a majority logic decision stage. The diversity channels and the output from the majority logic stage are connected to a channel switch as data channels. By means of a quality evaluation stage, one of the diversity channels is switched through to the data bank under the control of signals produced responsive to an indication that a minority of the diversity channels is better than each of the remaining diversity channels by a given quality difference. The majority decision channel is switched through with one of the control signals when the majority of the diversity channels are poorer than the remaining diversity channels during the given test period by another given quality difference.

5 Claims, 10 Drawing Figures

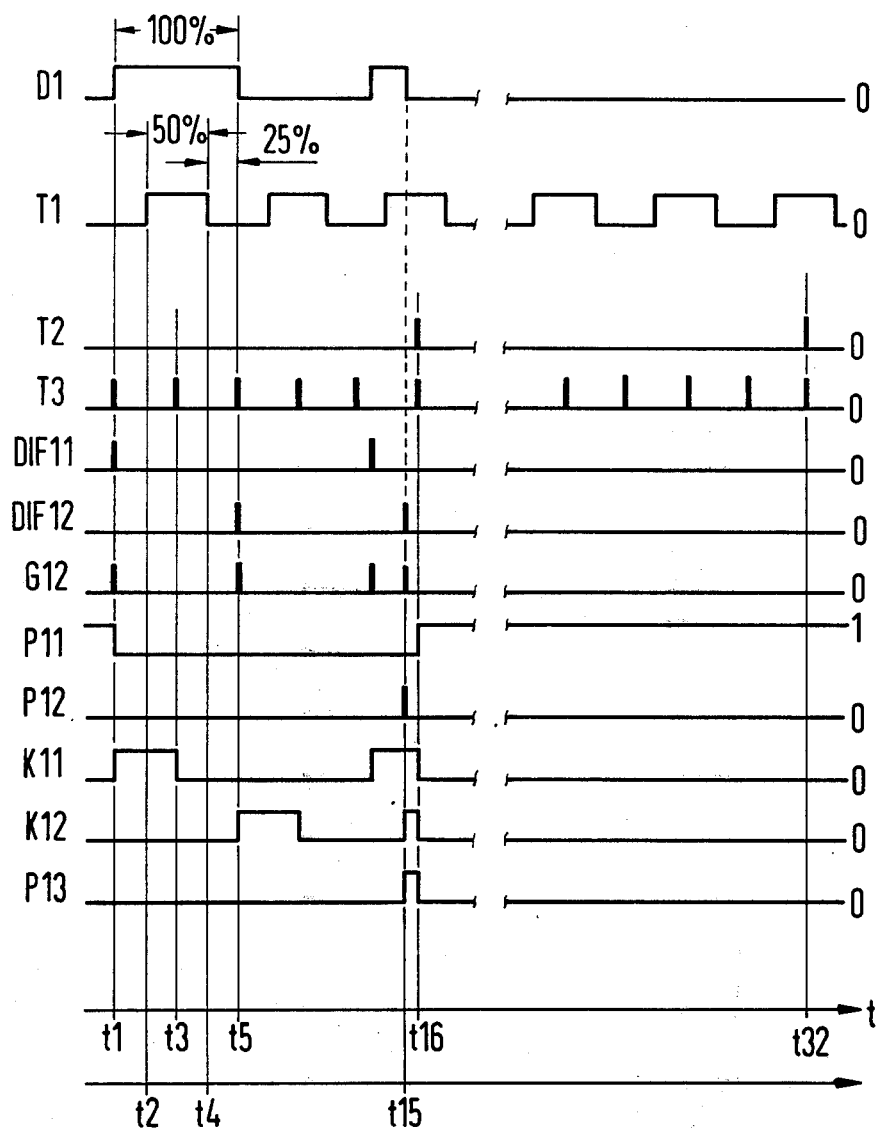

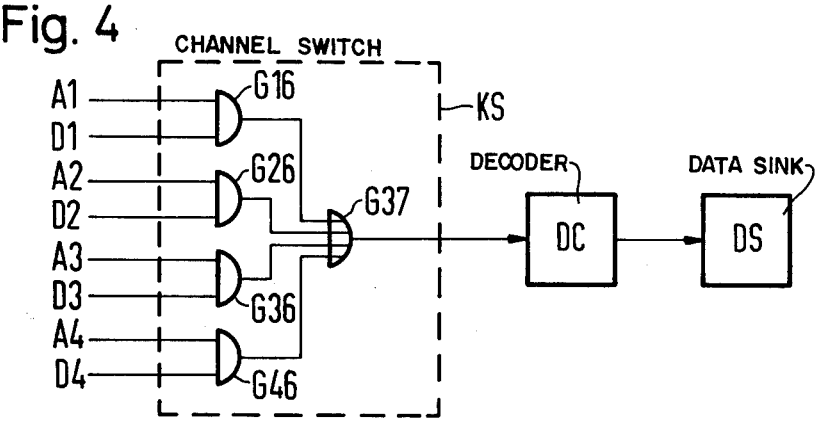
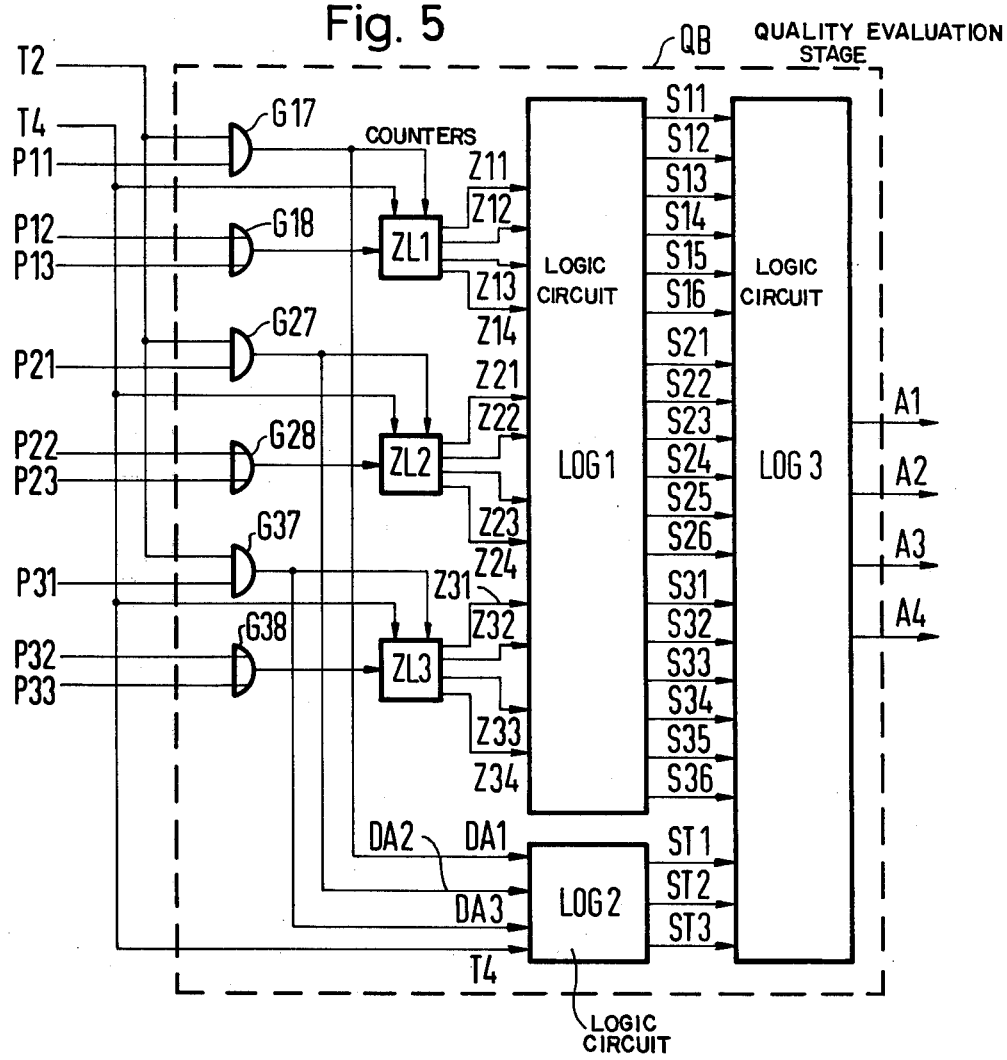

CIRCUIT ARRANGEMENT FOR DIVERSITY DATA TRANSMISSION

BACKGROUND OF THE INVENTION

The invention relates to a circuit arrangement for improving the quality of diversity data transmission employing a quality evaluation stage which generates control signals in relation to the quality of a plurality of diversity channels, with which one of a plurality of data channels is switched through to a data bank by means of a channel switch.

Using known space diversity transmission processes, time diversity transmission processes, or frequency diversity transmission processes the quality of the data transfer can be improved by establishing which of the diversity channels is the best and using it to transfer the data. The invention is based on the knowledge that the best diversity channel, although necessarily better than all the other individual channels, is not always of necessity better than the aggregate information contained as a whole in the remaining diversity channels.

Even when with known diversity processes a plurality of equivalent diversity channels are established as the best, it is difficult to discover the best form of data transfer. In this connection the invention is based on the discovery that the aggregate information contained in a plurality of equivalent best diversity channels is frequently better than any individual on of the equivalent best diversity channels.

It is an object of this invention to provide a means for utilizing the aforementioned discovery to improve the quality of data transfer using diversity techniques.

SUMMARY OF THE INVENTION

In accordance with the invention the foregoing and other objects are attained in a circuit arrangement wherein the diversity channels are connected to a majority decision stage which emits a majority signal via a majority decision channel; the binary values of the majority signal indicate the majority of the diversity channel binary values. For this the diversity channels and the majority decision channel are connected to a channel switch as data channels, and using the quality evaluation stage one of the diversity channels is switched through to the data bank with one of a plurality of appropriately generated control signals when a minority of diversity channels is better than each of the remaining diversity channels during a given test period by at least a first quality difference. The majority decision channel is switched through with one of the control signals when the majority of the diversity chanels is poorer than each of the remaining diversity channels during the given test period by at most a second quality difference.

The circuit arrangement in accordance with the invention is advantageous in that in the case of a plurality of diversity channels having been established as the best diversity channels, and qualitatively equivalent during a given test period, a majority signal is switched through which is better than the individual diversity signals because with this majority signal the most probable binary value is transferred bit by bit. Thus, a majority signal is generated which differs in general from all diversity signals, and the quality of this majority signal can be estimated as higher than the quality of the individual diversity signals so that in comparison with known diversity data transfers a further quality improvement can be noted.

BRIEF DESCRIPTION OF THE DRAWINGS

The principles of the invention will be more readily understood by reference to the following description of a preferred embodiment constructed accordingly and which is illustrated in the drawings which are briefly described below.

FIG. 3 is a time-wave form diagram showing signals generated with the test device shown in FIG. 2.

FIG. 4 is a detailed schematic diagram of a channel switch constructed according to the invention.

FIG. 5 is a detailed block-schematic diagram of a quality evaluation stage constructed according to the invention.

DETAILED DESCRIPTION OF THE PREFERRED EMBODIMENT

Figure 1:
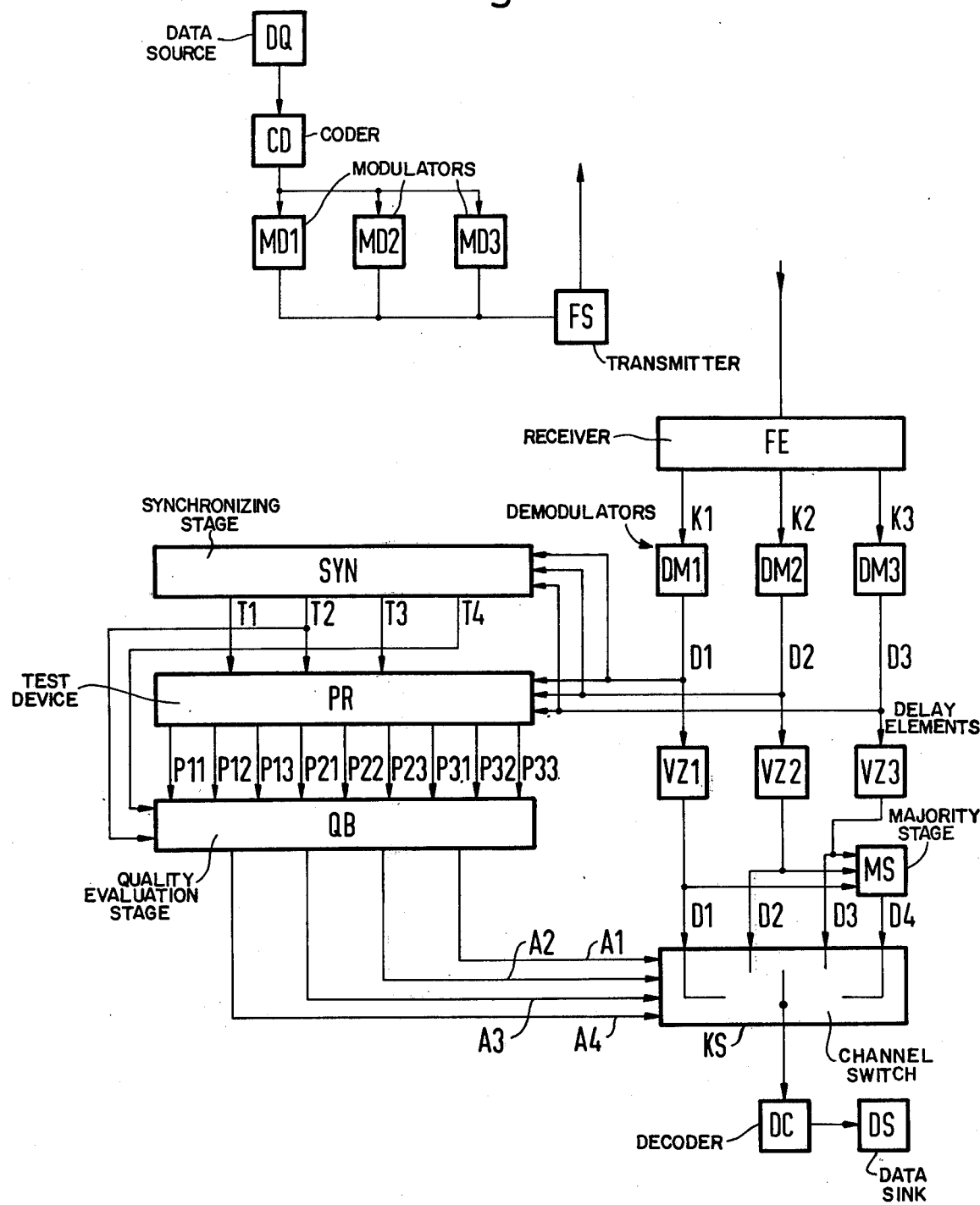
FIG. 1 is a block-schematic view of a data transmission system having a plurality of data channels with which the invention can be used.

FIG. 1 shows a data transfer system comprising a data source DQ, coder CD, modulators MD1, MD2, MD3, transmitter FS, receiver FE, demodulators DM1, DM2, DM3, delay elements VZ1, VZ2, VZ3, majority stage MS, the synchronizing stage SYN, test device PR, quality evaluation stage QB, channel switch KS, decoder DC and data bank DS. In this and the other figures herein like reference letters and numerals refer to like elements.

The data source DQ may take the form of a teleprinter, for example, which emits the separate bits of a pattern sequentially. The two binary values of binary signals are taken as zero and as one. The data supplied at the input is converted with the coder CD. It the coder receives a signal equal to zero or one at the input for a lengthy period, it emits a signal the binary value of which changes. One carrier is modulated with the output signal from the coder and each of the modulators MD1, MD2, MD3. The frequencies of these carriers differ and lie within the speech frequency band from 0.3 to 3.4 kHz. The outputs of the modulators are lined together so that a signal mixture comprising the modulated carriers is sent to the transmitter FS. In the transmitter FS the frequencies are transposed from the speech band to a short wave band and emitted after amplification.

The receiver FE receives the signal mixture and sends signals to three demodulators DM1, DM2, DM3 via frequency diversity channels K1, K2, K3. The signals D1, D2, D3 are sent from the outputs of the demodulators to the test device PR, the synchronizing stage SYN and the delay stages VZ1, VZ2, VZ3. The test device generates three types of test signals for each of the three channels so that a total of nine different test signals are produced. The first index of the test signals relates to the channel with which it is associated, the second index of the test signals relates to the signal type.

The signals P11, P21, P31 indicate whether changes in binary value occur with the signals D1, D2, D3. The signals P12, P22, P32 indicate distortion of the signals D1, D2, D3, and the signals P13, P23, P33 indicate speeds of individual bits of the signals D1, D2, D3.

The quality evaluation stage QB is used to determine the data channel having the best transmission characteristics at a given point in time. The channel switch KS is controlled using the signals A1, A2, A3, A4 such that one of the data channels D1, D2, D3, D4 is connected to the decoder DC by means of the output of the channel switch KS. Here, the data channels D1, D2, D3 directly correspond to the frequency diversity channels K1, K2, K3, respectively, whereas data channel D4 emanates from the majority stage MS.

The majority stage MS can be made in analog or digital form. With a digitally operating majority stage MS a zero value is always emitted via the data channel D4, for example, when the majority of the data channels D1, D2, D3 is transferring zero values. A one value is emitted via data channel D4 when the majority of the data channels D1, D2, D3 is carrying one values. It would also be conceivable to replace the majority stage MS with a threshold value stage, for instance, a digitally operating threshold value stage, which gives each data channel D1, D2, D3 specific value and moreover establishes the products of the binary values and the individual threshold values, as well as the sum of these products. The signal emitted from the data channel D4 then depends upon whether the sum of these products is smaller than a given threshold value.

In general the test device PR, the quality evaluation stage QB, the channel switch KS and the majority stage MS are operated such that one of the data channels D1, D2, D3 is always switched through when this data channel is essentially better than the majority of all diversity channels. In contrast the data channel D4 is always switched through when the majority of the diversity channels is poorer than the remaining diversity channels, at most, by one given quality difference.

Thus, with the channel switch KS one of the data channels D1 to D4 is always switched through to the decoder DC, the output of which is connected to the input of the data bank DS. The data bank may take the form of a teleprinter, for example. To this point a frequency diversity system has been described with reference to FIG. 1. However, the invention is applicable in the same way to a space diversity system or a time diversity system. The diversity channels K1, K2, k3 shown in FIG. 1 could also be replaced by a larger uneven number of diversity channels, for instance five channels.

Figure 2:
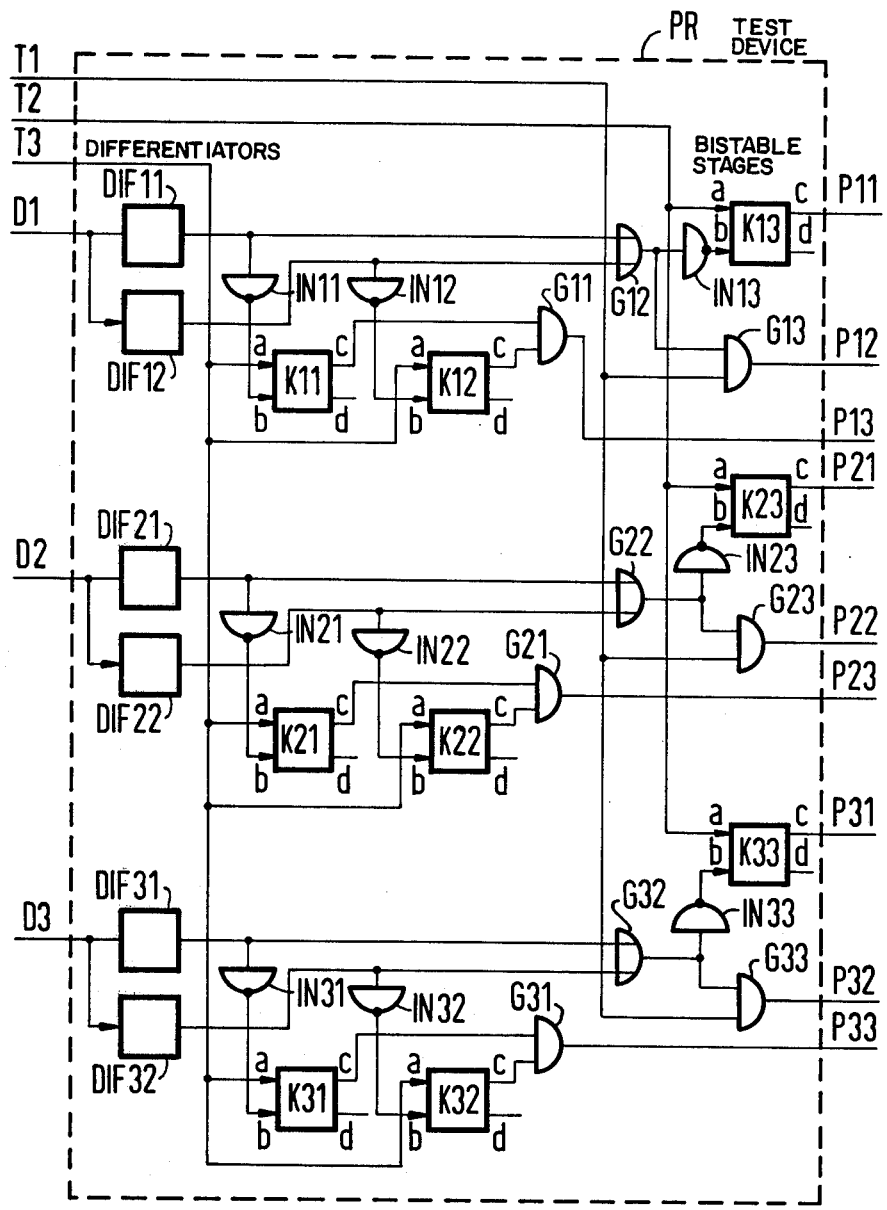
FIG. 2 is a block-schematic diagram of a test device constructed according to the invention for obtaining a plurality of kinds of signals.

FIG. 2 shows in greater detail the test device PR illustrated diagrammatically in FIG. 1. For the first channel, second channel and third channel the test device contains differentiation stages DIF11, DIF12; DIF21, DIF22; DIF31, DIF32, repectively; bistable trigger stages K11, K12, K13; K21, K22, K23; K31, K32, K33; AND gates G11, G13; G21, G23; G31, G33; OR gates G12; G22; G32 and the inverters IN11, IN12, IN13; IN21, IN22, IN23; IN31, IN32, IN33. The trigger stages K11, K21, K31, K12, K22, K32 each have two inputs $a$ and $b$ and two outputs $c$ and $d$. Their two stable stages are the zero state and one state, respectively. For the duration of their zero state or one state they emit a zero signal or a one signal, respectively from the output $c$. Passage from the zero state to the one state occurs with the negative edge of a signal at input $a$ and a one signal at input $b$. Passage from the one state to the zero state also occurs with the negative edge of a signal at input $a$ and a zero signal at input $b$. With the trigger stages K13, K23, K33 the transition from the zero state to the one state is made with a negative signal at input $a$ and transition from the one state to the zero state is made with a negative signal at input $b$.

The signal D1 shown in FIG. 3 has the same reference symbol as the first data channel D1 along which it is transmitted. From the time $t1$ to the time $t5$ the one value of a bit is transmitted, corresponding to a period of 100%. The signals T1, T2, T3 are generated with the synchronizing device SYN shown diagrammatically in FIG. 1. From the time $t2$ to the time $t4$ a pulse of signal T1 is generated, corresponding to a period of 50%. The period $t2 - t1$ and $t5 - t4$ equals 25% in each case. The pulses of signal T2 characterize the duration of the test period which has been taken as 16 bits in the present case. The pulses of the signal T3 have double the repetition frequency of the pulses of signal T1.

With the differentiation stages DIF11 and DIF12 pulses are emitted corresponding to the positive and negative edges, respectively, of the signal D1. The signals DIF11, DIF12, G12, K11, K12 have the same reference symbols as the components from which they are emitted. The pulses of both signal DIF11 and DIF12 are emitted from the gate G12. It is assumed that the trigger stage K13 assumes its one state before the time $t1$ so that the signal P11 also has a one value by the time $t1$. At the time $t1$, the signal G12 is equal to 1 so that a zero signal is present at input $b$ and transition to the zero state is made, in which it remains until the time $t16$. The signal P11 emitted by the trigger stage K13 denotes, with P11 = 0 and P11 = 1, the presence or lack of, respectively, a change in the binary value of signal D1 within a test period.

When signals G12 and T1 coincide, the signal P12 is produced at the output of the gate G13 indicating distortions greater than ± 25% of the duration of a bit. This case arises with the stipulated conditions when pulse edges of the signal D1 coincide with the pulses of signal T1, as is the case at the time $t15$.

The output signals of the trigger stages K11 and K12 are led to the gate G11. When the speed of the individual pulses of signal D1 lies within a given theoretical range, the signals K11 and K12 do not overlap. If, however, one of the pulse edges of the signal D1, such as the pulse edge occurring at the time $t15$, is essentially in advance, the pulses of signals K11 and K12 overlap, and the signal P13 is emitted through the gate G11, indicating with P13 = 1 that the number of bits per second is too high.

FIG. 4 shows an exemplary embodiment of the channel switch KS illustrated diagrammatically in FIG. 1 and comprising AND gates G16, G26, G36, G46 and the OR gate G37.

FIG. 5 shows an embodiment example of the quality evaluation stage QB illustrated diagrammatically in FIG. 1 and comprising gates G17, G18, G27, G28, G37, G38, counters ZL1, ZL2, ZL3 and logic circuits LOG1, LOG2, LOG3.

Figure 6:
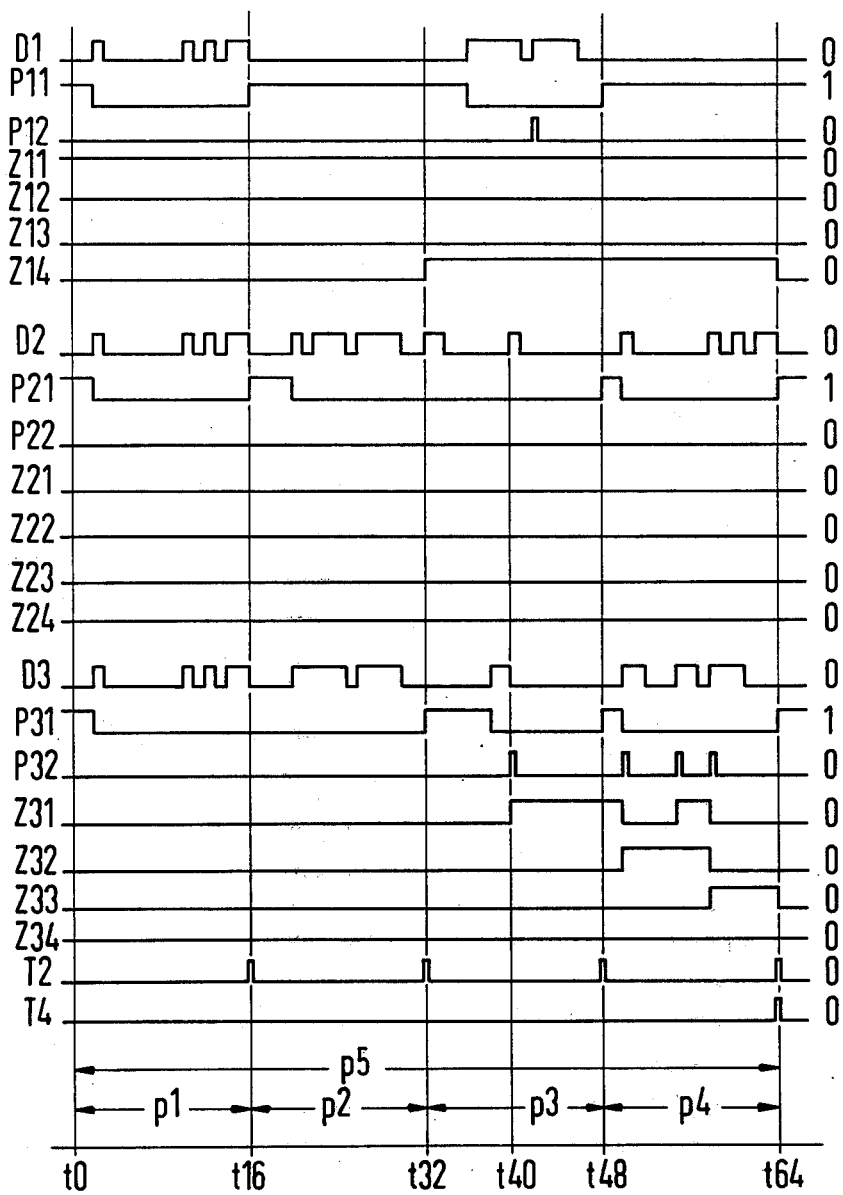
FIG. 6 is a time-waveform diagram showing signals that arise when operating the quality evaluation stage illustrated in FIG. 5.

In the following principles of operation of the quality evaluation stage shown in FIG. 5 are explained with reference to the signals shown in FIG. 6. It is assumed that from the time $t0$ to the time $t16$ during the test period $p1$ a total of 16 bits of the signals D1, D2, D3 are transferred. A second test period $p2$ begins from the time $t16$ and ends at the time $t32$, a third test period $p3$ begins at the time $t32$ and ends at time $t48$ and a fourth test period starts at time $t48$ and ends at time $t64$. In the course of each test period the test device PR shown in FIG. 2 emits a first series of signals P11, P21, P31 indicating step transfers of the signals D1, D2, D3. In addition, a second series of test signals P12, P32 is emitted with the test device PR, indicating distortions greater than ± 25%. Moreover, a third series of test signals P13, P23, P33 can be emitted, these indicating the speed of the individual bits of the signals D1, D2, D3, which are not shown in FIG. 6. The signals P12, P13, P22 P23, P32 and P33 are led to the gates G18, G28, G38, and the pulses emitted from these gates are conveyed to the counters ZL1, ZL2, ZL3 as counting pulses. It is assumed that the illustrated counters can each reach a maximum counter state of eight and that the counter states X1, Z2, Z3 actually reached are emitted as binary words along the lines Z11, Z12, Z13, Z14; Z21, Z22, Z23, Z24 and Z31, Z32, Z33, Z34, respectively, to the logic circuit LOG1. The counters count during the counting period $p5$ from the time $t0$ to the time $t64$, and are then reset with a pulse of signal T4. In the present case the counting period $p5$ is equal to four test periods $p1$.

The signal T2 and the signals P11, P21, P31 are conveyed to the gates G17, G27 and G37, respectively, and when a one signal is emitted to the counters ZL1, ZL2 and ZL3 respectively, the counter states Z1, Z2 and Z3 of these counters are raised. Depending upon the anticipated errors it may be desirable only to raise the counter states by one or more units, and it can be advantageous to set the maximum counter states at the same time. In the present embodiment example a one signal is sent at time $t32$ from the gate G17 to the counter ZL1, and with it the maximum counter state Z1 = 8 for this counter is set. Thus, the word 1000 is emitted along the output lines Z14, Z13, Z12, Z11, indicating as a binary number the counter state Z1 = 8. The poorer the data channel D1 is, the higher the counter state Z1 of the counter ZL1. This is because with the signal P11 = 1, which indicates the lack of any change in binary value, the maximum counter state Z1 = 8 is set immediately at time $t32$ and because with the signals P12 = 1 or P13 = 1, which indicate the distortions or excessively high speeds, the counter state of the counter ZL1 is also raised if this is still possible. Similarly, the counter states Z2 and Z3 of the counters ZL2 and ZL3, respectively, are higher, the poorer the corresponding channels D2 and D3 are.

In the present embodiment example at the time $t64$, the counter state Z2 = 0 is signalled by the counter ZL2, along with the word 0000, indicating that during the counting period $p5$ no errors have been found in the signal D2. Things are different in the case of the counter ZL3, which emits the word 0001 (Z3 = 1) at the time $t40$, because distortion has been indicated with the signal P32 = 1. From the time $t48$ to the time $t64$, further distortion is indicated by the signals P32 = 1, through which the counter state of the counter ZL3 is finally raised to 0.100, corresponding to a counter state of Z3 = 4. In the present embodiment example the counter states thus show data channel D2 as the best followed from the quality standpoint by channel D3, with channel D1 shown to be the poorest by the maximum counter state. Before the other operational aspects of the quality evaluation stage Qb can be examined more closely, the logic circuits LOG1, LOG2 and LOG3 will be explained in detail.

Figure 7:
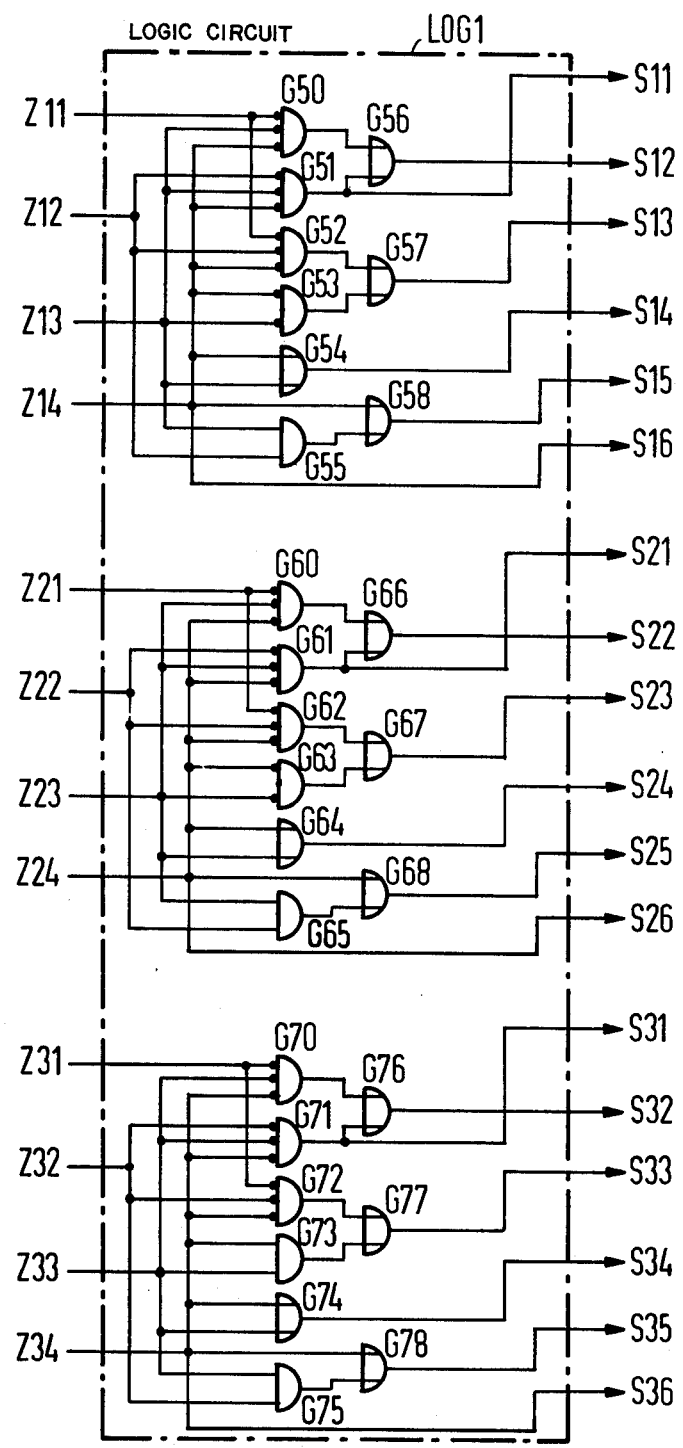
FIG. 7 is a detailed schematic diagram of a first logic circuit for the quality evaluation stage.

FIG. 7 shows in greater detail the logic circuit LOG1 comprising gates G50 to G58, G60 to G70 to G78. The gates G50 – 55, G60 – 65, G70 – 75 are AND gates, the inputs marked with dots signifying negations. For instance the gate G50 only emits a one signal when zero signals are present at all three inputs. Gate G55, for example, only emits a one signal when one signals are present at both inputs. The remaining gates shown in FIG. 7 are OR gates.

Table 1

| Z1 | Z14 | Z13 | Z12 | Z11 | S11 | S12 | S13 | S14 | S15 | S16 |
|---|---|---|---|---|---|---|---|---|---|---|
| 0 | 0 | 0 | 0 | 0 | 1 | 1 | 1 | 0 | 0 | 0 |
| 1 | 0 | 0 | 0 | 1 | 1 | 1 | 1 | 0 | 0 | 0 |
| 2 | 0 | 0 | 1 | 0 | 0 | 1 | 1 | 0 | 0 | 0 |
| 3 | 0 | 0 | 1 | 1 | 0 | 0 | 1 | 0 | 0 | 0 |
| 4 | 0 | 1 | 0 | 0 | 0 | 0 | 1 | 1 | 0 | 0 |
| 5 | 0 | 1 | 0 | 1 | 0 | 0 | 0 | 1 | 0 | 0 |
| 6 | 0 | 1 | 1 | 0 | 0 | 0 | 0 | 1 | 1 | 0 |
| 7 | 0 | 1 | 1 | 1 | 0 | 0 | 0 | 1 | 1 | 0 |
| 8 | 1 | 0 | 0 | 0 | 0 | 0 | 0 | 1 | 1 | 1 |

Table 1 shows the method of operation of the logic circuit LOG1 shown in FIG. 7 in regard to the generation of the signals S11 to S16 affecting the counter LZ1 shown in FIG. 5. In the first column of Table 1 the counter states Z1 of the counter ZL1 are recorded. The other four columns relate to the signals Z14, Z13, Z12, Z11 which also show the counter states of the counter ZL1 in a dual presentation. The signals S11, S12, S13, S14, S15, S16 are generated in relation to these counter states. The signal S11 = 1 indicates the counter state Z1 = 0 or Z1 = 1. The signal S12 indicates the counter states Z1 = 0, 1, 2. Signal 13 indicates one of the counter states Z1 = 0, 1, 2, 3, 4. Signal S14 indicates one of the counter states Z1 = 4, 5, 6, 7, 8. Signal S15 indicates one of the counter states Z1 = 6, 7, 8 and signal S16 indicates the counter state Z1 = 8. The counter states Z2 and Z3 of the counters ZL2 and ZL3 are indicated by the signals S21 and S26 and S31 to S36, respectively, in a similar manner as in Table 2 or Table 3.

Table 2

| Z2 | Z24 | Z23 | Z22 | Z21 | S21 | S22 | S23 | S24 | S25 | S26 |
|---|---|---|---|---|---|---|---|---|---|---|
| 0 | 0 | 0 | 0 | 0 | 1 | 1 | 1 | 0 | 0 | 0 |
| 1 | 0 | 0 | 0 | 1 | 1 | 1 | 1 | 0 | 0 | 0 |
| 2 | 0 | 0 | 1 | 0 | 0 | 1 | 1 | 0 | 0 | 0 |

Table 2-continued

| Z2 | Z24 | Z23 | Z22 | Z21 | S21 | S22 | S23 | S24 | S25 | S26 |
|----|-----|-----|-----|-----|-----|-----|-----|-----|-----|-----|
| 3 | 0 | 0 | 1 | 1 | 0 | 0 | 1 | 0 | 0 | 0 |
| 4 | 0 | 1 | 0 | 0 | 0 | 0 | 1 | 1 | 0 | 0 |
| 5 | 0 | 1 | 0 | 1 | 0 | 0 | 0 | 1 | 0 | 0 |
| 6 | 0 | 1 | 1 | 0 | 0 | 0 | 0 | 1 | 1 | 0 |
| 7 | 0 | 1 | 1 | 1 | 0 | 0 | 0 | 1 | 1 | 0 |
| 8 | 1 | 0 | 0 | 0 | 0 | 0 | 0 | 1 | 1 | 1 |

Table 3

| | Z34 | Z33 | Z32 | Z31 | S31 | S32 | S33 | S34 | S35 | S36 |
|---|-----|-----|-----|-----|-----|-----|-----|-----|-----|-----|
| 0 | 0 | 0 | 0 | 0 | 1 | 1 | 1 | 0 | 0 | 0 |
| 1 | 0 | 0 | 0 | 1 | 1 | 1 | 1 | 0 | 0 | 0 |
| 2 | 0 | 0 | 1 | 0 | 0 | 1 | 1 | 0 | 0 | 0 |
| 3 | 0 | 0 | 1 | 1 | 0 | 0 | 1 | 0 | 0 | 0 |
| 4 | 0 | 1 | 0 | 0 | 0 | 0 | 1 | 1 | 0 | 0 |
| 5 | 0 | 1 | 0 | 1 | 0 | 0 | 0 | 1 | 0 | 0 |
| 6 | 0 | 1 | 1 | 0 | 0 | 0 | 0 | 1 | 1 | 0 |
| 7 | 0 | 1 | 1 | 1 | 0 | 0 | 0 | 1 | 1 | 0 |
| 8 | 1 | 0 | 0 | 0 | 0 | 0 | 0 | 1 | 1 | 1 |

Figure 8:
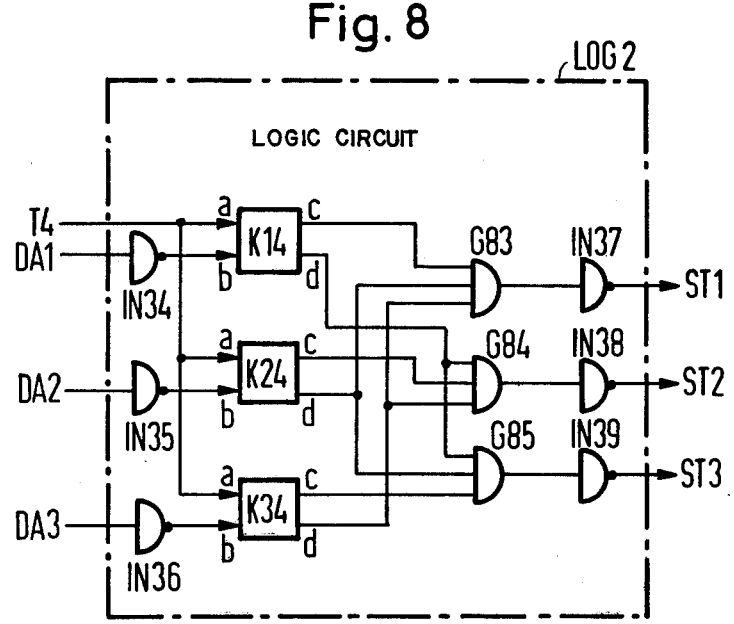
FIG. 8 is a detailed schematic diagram of a second logic circuit of the quality evaluation stage shown in FIG. 5.

FIG. 8 shows in greater detail logic circuit LOG2 comprising inverters IN34, IN35, IN36, IN37, IN38, IN39, trigger stages K14, K24, K34 and AND gates G83, G84, G85. The trigger stages K14, K24, K34 work like the trigger stages K13, K23, K33 discussed above. The logic circuit LOG2 receives the signal T4 shown in FIG. 6 at the bottom and which resets the trigger stages K14, K24 and K34 to their one states at the end of the counting period p5, at the time t64. As FIG. 5 shows, the signals DA1, DA2 and DA3 are obtained with the aid of the gates G17, G27 and G37, respectively. The signals DA1 = 0, DA2 = 0 and DA3 = 0 indicate that the corresponding data signals D1, D2 and D3 exhibit changes in binary value during the counting period p4 for which reason, as already described, the counter states Z1, Z2, Z3 are not raised in this case. On the other hand the signals DA1 = 1, DA2 = 1 and DA3 = 1 indicate the lack of any change in binary value in the data signals D1, D2 and D3, respectively, for which reason again, as already described, the counter states are raised. With the aid of the logic circuit LOG2 those cases are indicated in which only one data signal D1 or D2 or D3 exhibits a change in binary value and thus should be switched through via the output of the channel switch KS independently of the signal D4 from the majority stage MS.

Table 4 gives a survey of these cases in which only one of the data signals exhibits orderly changes in binary value. In the topmost line the signals DA1, DA2, DA3, plus the trigger stages K14, K24, K34 and the output signals ST1, ST2 and ST3 are shown. The following line relates to the case where only the data signal D1 exhibits orderly changes in binary value, which is indicated by the signal DA1 = 0. This condition is characterized by the signal ST1 = 1 and indicated subsequently to the logic circuit LOG3. The numbers entered under the trigger stages K14, K24, and K34 denote the state of these trigger stages. In a similar way signals ST2 = 1 and ST3 = 1 indicate that only the data signal D2 and D3, respectively, exhibits orderly changes in binary value.

Table 4

| DA1 | DA2 | DA3 | K14 | K24 | K34 | ST1 | ST2 | ST3 |
|-----|-----|-----|-----|-----|-----|-----|-----|-----|
| 0 | 1 | 1 | 1 | 0 | 0 | 1 | 0 | 0 |
| 1 | 0 | 1 | 0 | 1 | 0 | 0 | 1 | 0 |
| 1 | 1 | 0 | 0 | 0 | 1 | 0 | 0 | 1 |

Figure 9:
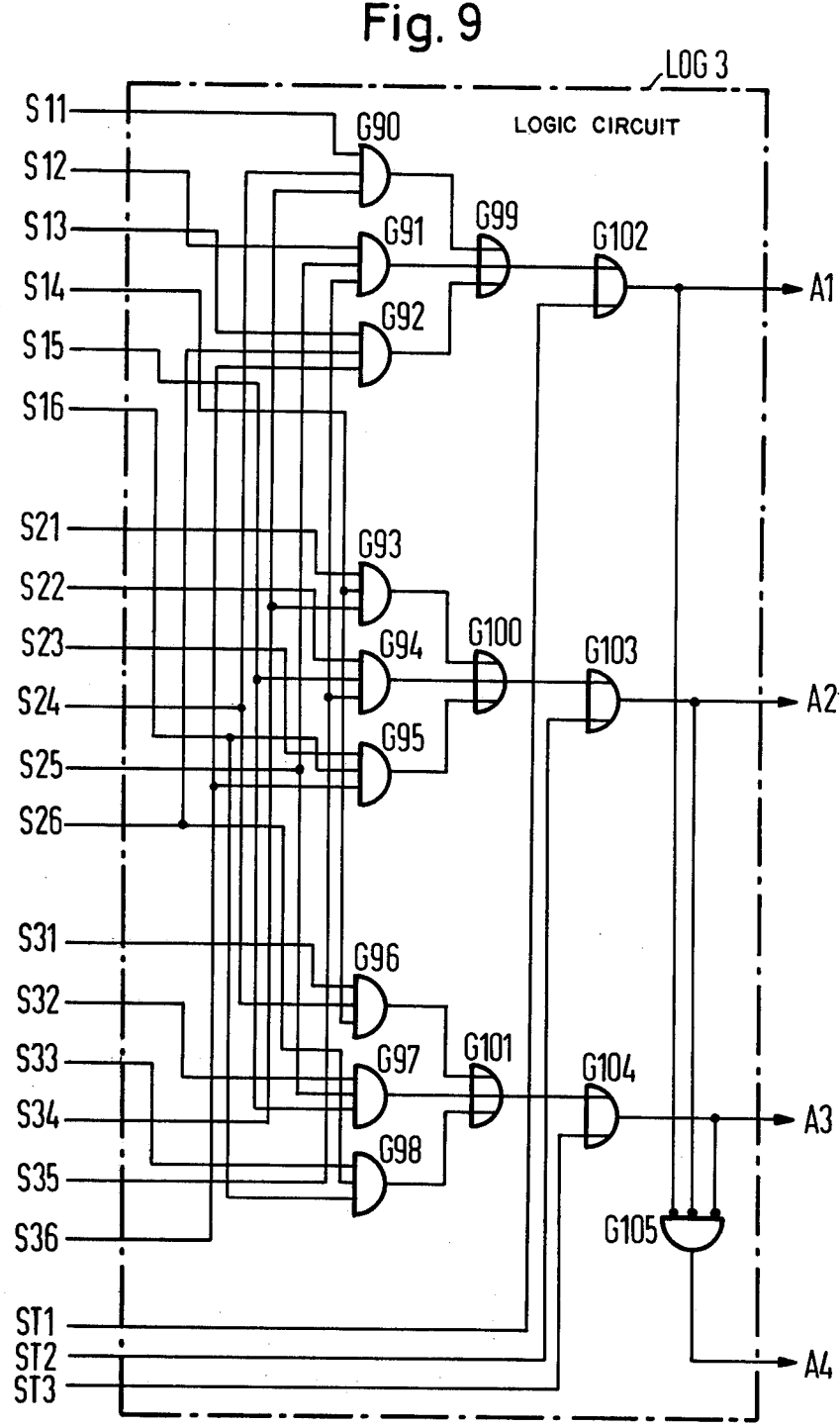
FIG. 9 is a detailed schematic diagram of a third logic circuit of the quality evaluation stage shown in FIG. 5.

FIG. 9 shows in greater detail, the logic circuit LOG3 comprising gates G90 to G105 of which, for example, the gate G90 is an AND gate, the gate G99 is an OR gate and the gate G105 is also an AND gate, but with negated inputs. This logic circuit LOG3 generates the control signals A1, A2, A3, A4 with which one of the data channels D1, D2, D3, D4 shown in FIG. 1 is selected at any time and switched through to the output of the channel switch KS.

Table 5 shows the method of operation of the logic circuit LOG3 shown in FIG. 9. The counter states Z1, Z2, Z3 and the control signals A1, A2, A3, A4 which switch through one of the channels D1, D2, D3, D4 are given in the lines at the head of this table 5. Under the counter states Z1, Z2, Z3 the individual combinations of possible counter states are entered. Under the control signals A1 to A4 are given their binary values 0 to 1. This table shows, in line 1 for example, that the channel D1 is switched through with Z1 = 0, Z2 = 4, Z3 = 4. This diversity channel D1 is better than each of the remaining diversity channels by at least a first quality difference. This first quality difference is shown by the difference in the counter states Z1, Z2, Z3. In the case of the counter state combination 044 the difference Z2 − Z1 = 4 and the difference Z3 − Z1 = 4. The counter state Z1 is thus better than the diversity channel D2 with the counter state Z2 = 4 by the difference 4 and the counter state Z1 is better than the diversity channel D3 with the counter state Z3 = 4 by the difference 4. Conditions are similar with the counter state combinations 045, 046, 047, 048. As the counter state combination 144 in 1 shows, the first quality difference must be equal to at least 3 expressed in counter state differences.

In the case of line 11 and the counter state conbination 043 the majority decision channel D4 is switched through. In this case the diversity channels D2 and D3 are poorer than diversity channel D1 at the most by a second quality difference. Here the diversity channels D2 and D3 represent the majority of the diversity channels, in contrast to the remaining diversity channel D1. This second quality difference is also expressed by the counter state and is a maximum of 3 in the present embodiment example. For example in the case of the counter state combination 043 the channel D2 with the counter state Z2 = 4 is poorer than channel D1 with the counter state Z1 = 0 by the counter state difference 4. Moreover the channel D3 with the counter state Z3 = 3 is poorer than channel D1 with the counter state Z1 = 0 by the counter state difference 3. Since both channels D2 and D3 are only poorer than channel D1 by the counter state difference 3, the majority decision channel D4 is switched through.

Table 5

| Lines | Z1 | Z2 | Z3 | A1 | A2 | A3 | A4 | Lines | Z1 | Z2 | Z3 | A1 | A2 | A3 | A4 |
|---|---|---|---|---|---|---|---|---|---|---|---|---|---|---|---|
| 1 | 0–1 | 4–8 | 4–8 | 1 | 0 | 0 | 0 | 36 | 8 | 5 | 2 | 0 | 0 | 0 | 1 |
| 2 | 2 | 6–8 | 6–8 | 1 | 0 | 0 | 0 | 37 | 6–8 | 5 | 5–8 | 0 | 0 | 0 | 1 |
| 3 | 3–4 | 8 | 8 | 1 | 0 | 0 | 0 | 38 | 7–8 | 6 | 6–8 | 0 | 0 | 0 | 1 |
| 4 | 4–8 | 0–1 | 4–8 | 0 | 1 | 0 | 0 | 39 | 8 | 7 | 7–8 | 0 | 0 | 0 | 1 |
| 5 | 6–8 | 2 | 6–8 | 0 | 1 | 0 | 0 | 40 | 0–3 | 1–8 | 0 | 0 | 0 | 0 | 1 |
| 6 | 8 | 3–4 | 8 | 0 | 1 | 0 | 0 | 41 | 4–8 | 1–3 | 0 | 0 | 0 | 0 | 1 |
| 7 | 4–8 | 4–8 | 0–1 | 0 | 0 | 1 | 0 | 42 | 1–3 | 2–8 | 1 | 0 | 0 | 0 | 1 |
| 8 | 6–8 | 6–8 | 2 | 0 | 0 | 1 | 0 | 43 | 4–8 | 2–3 | 1 | 0 | 0 | 0 | 1 |
| 9 | 8 | 8 | 3–4 | 0 | 0 | 1 | 0 | 44 | 2–5 | 3–8 | 2 | 0 | 0 | 0 | 1 |
| 10 | 0 | 0–3 | 1–8 | 0 | 0 | 0 | 1 | 45 | 6–7 | 3–5 | 2 | 0 | 0 | 0 | 1 |
| 11 | 0 | 4–8 | 1–3 | 0 | 0 | 0 | 1 | 46 | 8 | 3–4 | 2 | 0 | 0 | 0 | 1 |
| 12 | 1 | 1–3 | 2–8 | 0 | 0 | 0 | 1 | 47 | 3–7 | 4–8 | 3 | 0 | 0 | 0 | 1 |
| 13 | 1 | 4–8 | 2–3 | 0 | 0 | 0 | 1 | 48 | 8 | 4–7 | 3 | 0 | 0 | 0 | 1 |
| 14 | 2 | 2–5 | 3–8 | 0 | 0 | 0 | 1 | 49 | 4–7 | 5–8 | 4 | 0 | 0 | 0 | 1 |
| 15 | 2 | 6–7 | 3–5 | 0 | 0 | 0 | 1 | 50 | 8 | 5–7 | 4 | 0 | 0 | 0 | 1 |
| 16 | 2 | 8 | 3–4 | 0 | 0 | 0 | 1 | 51 | 2 | 8 | 5 | 0 | 0 | 0 | 1 |
| 17 | 3 | 3–7 | 4–8 | 0 | 0 | 0 | 1 | 52 | 5–8 | 6–8 | 5 | 0 | 0 | 0 | 1 |
| 18 | 3 | 8 | 4–7 | 0 | 0 | 0 | 1 | 53 | 6–8 | 7–8 | 6 | 0 | 0 | 0 | 1 |
| 19 | 4 | 4–7 | 5–8 | 0 | 0 | 0 | 1 | 54 | 7–8 | 8 | 7 | 0 | 0 | 0 | 1 |
| 20 | 4 | 8 | 5–7 | 0 | 0 | 0 | 1 | 55 | 0 | 0 | 0 | 0 | 0 | 0 | 1 |
| 21 | 5 | 2 | 8 | 0 | 0 | 0 | 1 | 56 | 1 | 1 | 1 | 0 | 0 | 0 | 1 |
| 22 | 5 | 5–8 | 6–8 | 0 | 0 | 0 | 1 | 57 | 2 | 2 | 2 | 0 | 0 | 0 | 1 |
| 23 | 6 | 6–8 | 7–8 | 0 | 0 | 0 | 1 | 58 | 3 | 3 | 3 | 0 | 0 | 0 | 1 |
| 24 | 7 | 7–8 | 8 | 0 | 0 | 0 | 1 | 59 | 4 | 4 | 4 | 0 | 0 | 0 | 1 |
| 25 | 1–8 | 0 | 0–3 | 0 | 0 | 0 | 1 | 60 | 5 | 5 | 5 | 0 | 0 | 0 | 1 |
| 26 | 1–3 | 0 | 4–8 | 0 | 0 | 0 | 1 | 61 | 6 | 6 | 6 | 0 | 0 | 0 | 1 |
| 27 | 2–8 | 1 | 1–3 | 0 | 0 | 0 | 1 | 62 | 7 | 7 | 7 | 0 | 0 | 0 | 1 |
| 28 | 2–3 | 1 | 4–8 | 0 | 0 | 0 | 1 | 63 | 8 | 8 | 8 | 0 | 0 | 0 | 1 |
| 29 | 3–8 | 2 | 2–5 | 0 | 0 | 0 | 1 | | | | | | | | |
| 30 | 3–5 | 2 | 6–7 | 0 | 0 | 0 | 1 | | | | | | | | |
| 31 | 3–4 | 2 | 8 | 0 | 0 | 0 | 1 | | | | | | | | |
| 32 | 4–8 | 3 | 3–7 | 0 | 0 | 0 | 1 | | | | | | | | |
| 33 | 4–7 | 3 | 8 | 0 | 0 | 0 | 1 | | | | | | | | |
| 34 | 5–8 | 4 | 4–7 | 0 | 0 | 0 | 1 | | | | | | | | |
| 35 | 5–7 | 4 | 8 | 0 | 0 | 0 | 1 | | | | | | | | |

Figure 10:
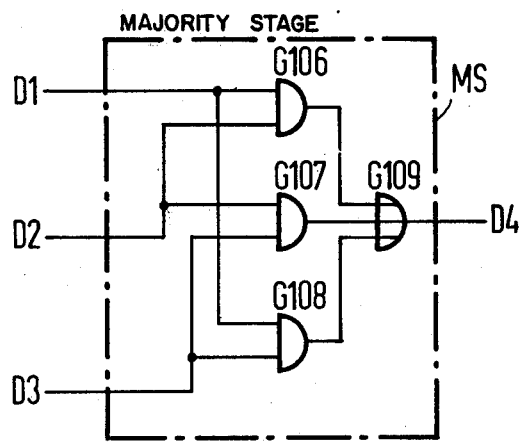
FIG. 10 is a detailed schematic diagram of a majority stage used in conjunction with the FIG. 1.

FIG. 10 shows an embodiment example of the majority stage MS shown diagrammatically in FIG. 1. It comprises AND gates G106, G107 G108 and OR gate G109. In principle the majority stage MS is a collator the function of which can be seen in Table 6. Thus, data channel D4 always emits a binary value which indicates the majority of the binary values in the data channels D1, D2, D3.

Table 6

| D1 | D2 | D3 | D4 |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 0 |
| 1 | 0 | 1 | 1 |
| 1 | 1 | 0 | 1 |
| 1 | 1 | 1 | 1 |

The method of operation of the majority stage MS shown in FIG. 10 can be seen from the following equation:

$$D4 = (D1 \lor D2) \& (D1 \lor D3) \& (D2 \lor D3)$$

in which:
V = disjunction and
& = conjunction.

The principles of this invention are described hereinabove by describing the structure and principles of operation of a preferred embodiment constructed accordingly. It is contemplated that the described embodiment can be modified or changed in a number of ways known to those skilled in the art while remaining within the scope of the invention, as defined by the appended claims.

We claim:

1. A circuit arrangement for increasing the transmission quality in a diversity data transmission system, comprising:
   a plurality of diversity data channels,
   majority logic circuit means connected to receive said diversity data channels for emitting a majority signal indicating which binary value a majority of said diversity data channels is carrying,
   channel switch means having inputs connected to receive said diversity data channels and said majority signal as data channels,
   quality evaluation means for operating said channel switch means to emit the signal on one of said diversity data channels when during a predetermined test period a minority of said diversity data channels are of better transmission quality than the remaining diversity data channels by a first predetermined value, said quality evaluation means being operable to cause said channel switch means to switch through said majority signal when during said test period the majority of said diversity data channels are of poorer quality than the remaining diversity data channels by a predetermined second value.

2. The circuit arrangement define in claim 1 further comprising:
   test circuit means for generating first test signals indicating, respectively, a lack of changes in the binary values of data signals being carried by said diversity data channels are for generating test signals of a second type indicating distortions on said diversity data channels,
   said first and second test signals being coupled to said quality evaluation means for operating said channel switch means in accordance with the values of said first and second test signals.

3. The circuit arrangement defined in claim 2 wherein said quality evaluation means comprises:

a plurality of binary counters, one for each diversity data channel, said first and second test signals being coupled, respectively, to first and second inputs of said binary counters, the values registered by said binary counters indicating the transmission qualities in said diversity data channels, said first and second values corresponding to first and second differences, respectively, in the values registered by said binary counters.

4. The circuit arrangement defined in claim 2 wherein said test means further comprises means for generating third test signals indicating the respective rates of transmission on said diversity data channels, said third test signals being coupled to said second inputs of said binary counters.

5. The circuit arrangement defined in claim 4 wherein said binary counters are constructed to be advanced in greater increments by said first test signals than by said second or third test signals, said binary counters being reset after a counting period equal to said test period or a multiple thereof, said binary counters having outputs for emitting counting signals whereby higher-valued counting signals represent poor transmission qualities.

* * * * *